United States Patent [19]

Barito

[11] Patent Number: 5,439,360
[45] Date of Patent: Aug. 8, 1995

[54] SELF-ADJUSTING CRANKSHAFT DRIVE

[75] Inventor: Thomas R. Barito, East Syracuse, N.Y.

[73] Assignee: Carrier Corporation, Syracuse, N.Y.

[21] Appl. No.: 734,009

[22] Filed: Jul. 22, 1991

[51] Int. Cl.⁶ .......................... F04C 18/04; F16D 3/48
[52] U.S. Cl. .................................... 418/55.5; 418/57; 464/106; 464/138
[58] Field of Search .................. 464/106, 137, 138; 418/55.1, 55.5, 57; 74/595

[56] References Cited

U.S. PATENT DOCUMENTS

| | | | |
|---|---|---|---|
| Re. 33,473 | 12/1990 | Hazaki et al. | 418/55.5 |
| 547,180 | 10/1895 | Nash . | |
| 1,063,616 | 6/1913 | Stephens . | |
| 2,312,648 | 3/1941 | Jones | 80/55 |
| 2,324,168 | 4/1941 | Montelius | 418/55.2 |
| 2,421,685 | 6/1947 | Crot et al. | 308/18 |
| 2,757,908 | 2/1955 | Broadwin | 259/72 |
| 3,560,119 | 12/1968 | Busch et al. | 418/55.3 |
| 3,724,238 | 4/1973 | Retale et al. | 64/7 |
| 3,989,422 | 11/1976 | Güttinger | 418/55.1 |
| 3,994,633 | 11/1976 | Shaffer | 418/5 |
| 4,109,319 | 8/1978 | Brandt | 366/219 |
| 4,109,976 | 8/1978 | Koch | 308/36.1 |
| 4,111,499 | 9/1978 | McCloskey | 308/72 |
| 4,251,122 | 2/1981 | McCloskey | 308/72 |
| 4,531,897 | 7/1985 | Onlita | 417/500 |
| 4,561,346 | 12/1985 | Marquer | 99/348 |
| 4,673,376 | 6/1987 | Fender | 464/158 |
| 4,702,610 | 10/1987 | Reynolds, Jr. | 366/213 |
| 4,747,693 | 5/1988 | Kahl | 366/208 |
| 4,749,344 | 6/1988 | Tomita et al. | 418/55.6 |
| 4,750,845 | 6/1988 | Nabetani | 366/208 |
| 4,808,094 | 2/1989 | Sugimoto et al. | 464/138 X |
| 4,836,758 | 6/1989 | Elson et al. | 464/112 X |
| 4,954,057 | 9/1990 | Caillat et al. | 418/55.6 |
| 5,060,151 | 10/1991 | Mikyska et al. | 364/400 |
| 5,104,231 | 4/1992 | Collier et al. | 366/208 |
| 5,174,738 | 12/1992 | Baumann et al. | 418/55.5 |
| 5,186,546 | 2/1993 | Abe | 384/206 |
| 5,199,862 | 4/1993 | Kondo et al. | 418/55.1 |

FOREIGN PATENT DOCUMENTS

| | | |
|---|---|---|
| 0192351 | 8/1986 | European Pat. Off. . |
| 419054 | 10/1910 | France . |
| 535758 | 1/1922 | France . |
| 2012233 | 9/1971 | Germany . |
| 58-70003 | 4/1983 | Japan . |
| 58-172402 | 10/1983 | Japan . |
| 61-274804 | 12/1986 | Japan . |
| 62-75092 | 4/1987 | Japan . |
| 62-159782 | 7/1987 | Japan | 418/57 |
| 62-159783 | 7/1987 | Japan | 418/57 |
| 176555 | 5/1989 | Japan . |
| 061380531 | 12/1989 | Japan . |
| 236970 | 10/1990 | Japan . |
| 396678 | 4/1991 | Japan . |
| 3179188 | 8/1991 | Japan . |
| 3233179 | 10/1991 | Japan . |
| 3260387 | 11/1991 | Japan . |
| 5126068 | 5/1993 | Japan . |
| 5187367 | 7/1993 | Japan . |
| 5240047 | 9/1993 | Japan . |
| 114591 | 7/1945 | Sweden . |
| 1092548 | of 0000 | United Kingdom . |
| 1470008 | 4/1977 | United Kingdom . |
| 2180888 | 4/1987 | United Kingdom . |

Primary Examiner—John J. Vrabik

[57] ABSTRACT

An eccentric drive pin is located on the overhung end of a crankshaft. The drive pin is located within a bore in a slider block which is located within the hub of an orbiting scroll. Either the drive pin or the slider block bore has an axially curved surface and the other has a corresponding flat surface parallel to the axis of the crankshaft. Contact between the axially curved and corresponding flat surface remains at essentially the same axial location even though the drive pin is deflected under loading.

5 Claims, 2 Drawing Sheets

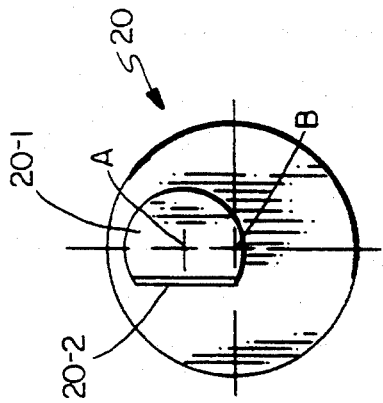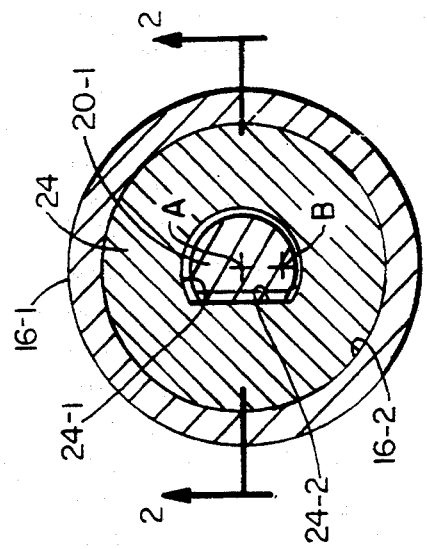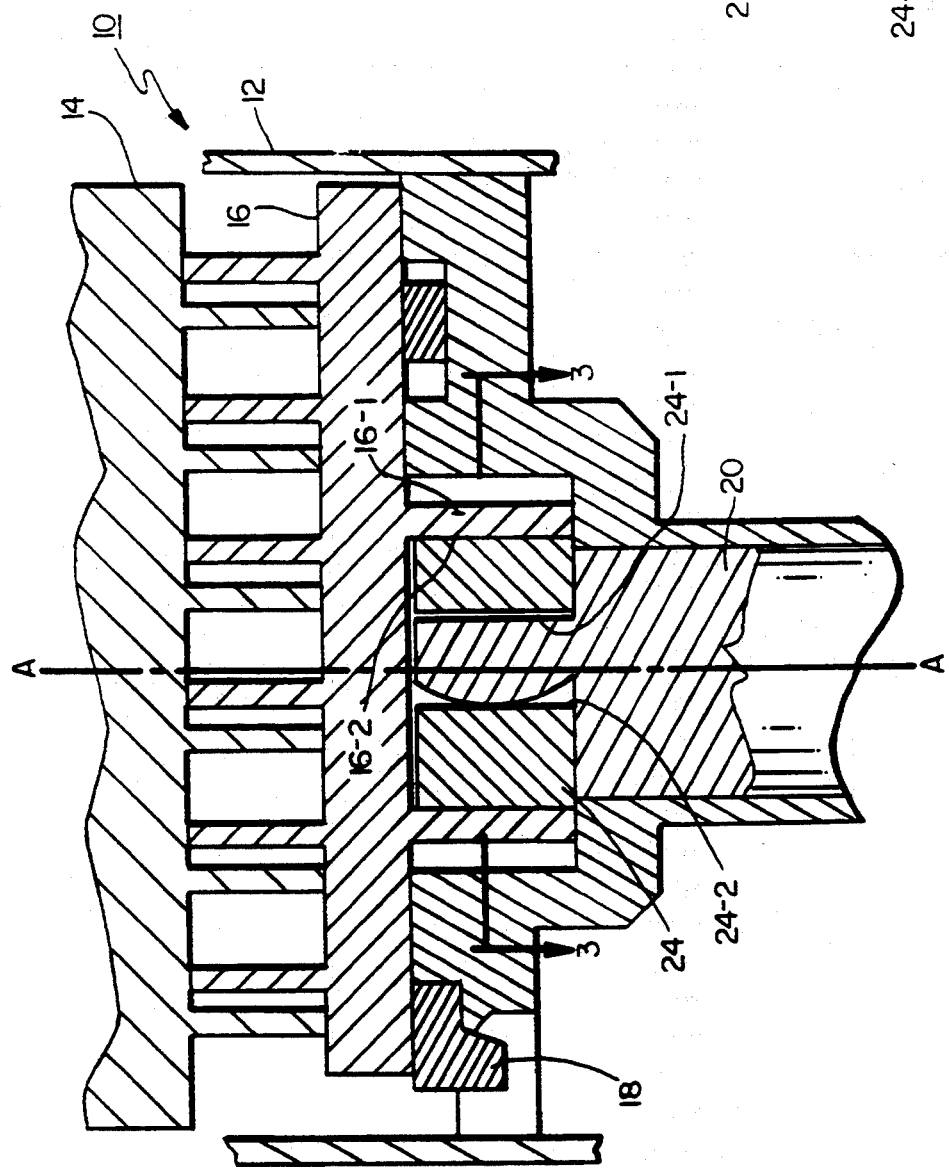

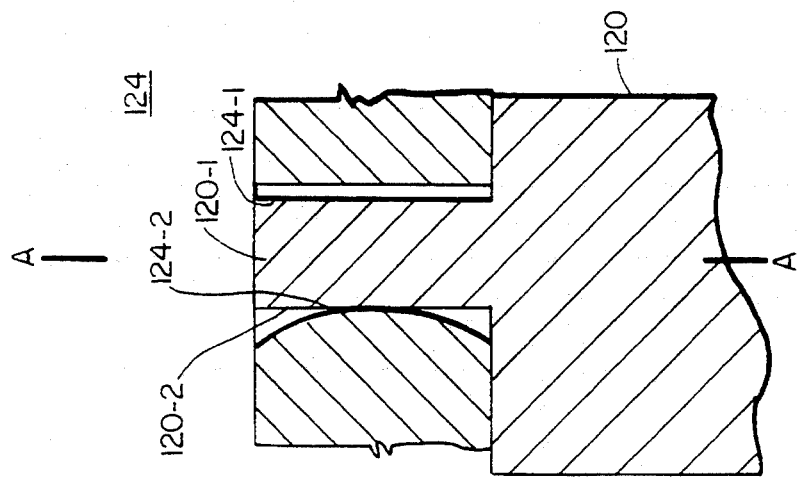
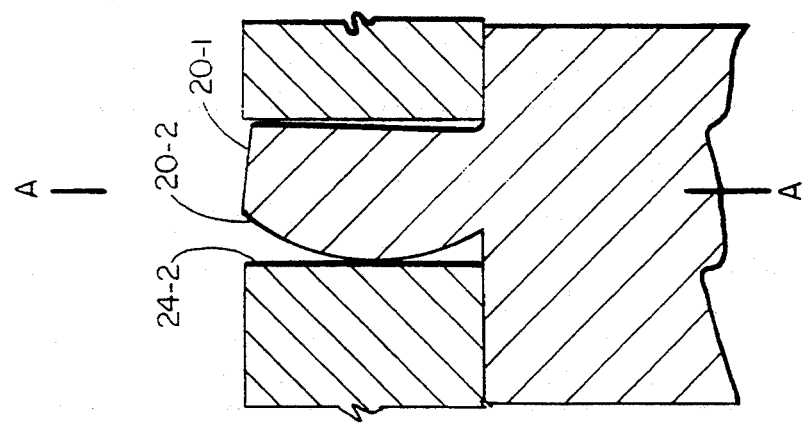
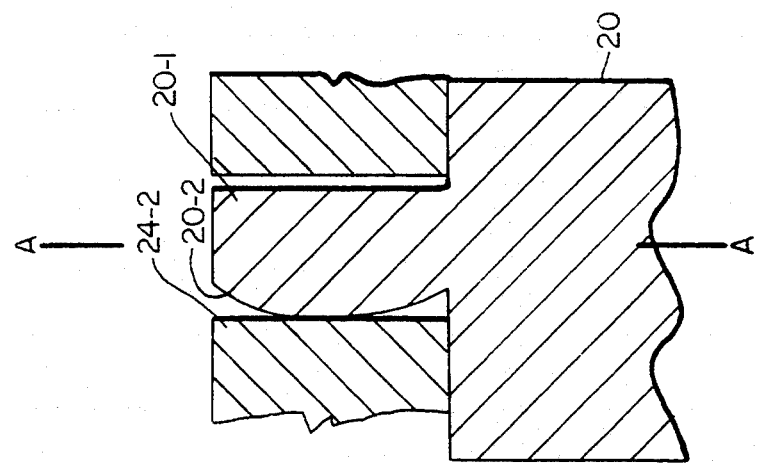

SELF-ADJUSTING CRANKSHAFT DRIVE

BACKGROUND OF THE INVENTION

In some scroll compressors the crankshaft is supported at one end and near the other end such that an eccentric drive pin is overhung or cantilevered with respect to the bearing support. The drive pin coacts with the orbiting scroll of the compressor through a slider block or bushing which permits the drive pin to rotate while the orbiting scroll is held to an orbiting motion through an anti-rotation mechanism such as an Oldham coupling. The coaction between the drive pin and slider block is complicated by the nature of the force transmission. If the contacting members are not aligned, there will be edge loading, but there is a deflection of the cantilevered drive pin and/or crankshaft under load which produces a change in the nature and location of the contact.

In U.S. Pat. No. 4,836,758 this deflection of the drive pin and/or crankshaft under load is addressed by having the desired contact take place as a result of the deflection under load. In one example the canting or deflection of the crankshaft causes the drive pin to go from a line contact to an area contact with the slider block or bushing. In a second example the drive pin deflects or cants causing it to go from a line contact to an area contact with the slider block or bushing. In a third example, there is area contact between the drive pin and bushing, but only a line contact between the bushing and hub of the orbiting scroll until deflection of the crankshaft takes place. In each case, the line contact is at the point closest to the orbiting scroll which is the point of greatest overhang. As a result, the forces act at the greatest lever arm until area contact is achieved. Presumably, at forces greater than the design load there will be a line contact at the point farthest from the orbiting scroll if there is continued deflection. These designs overcompensate in that the desired contact surface must deform to obtain an even contact with the bushing or slider block which is actually applying the load. However, it is only at one load, with tolerances, in which the parts align for surface contact.

SUMMARY OF THE INVENTION

Load induced shaft deflections and excursions of the orbiting scroll of a scroll compressor can create a situation which results in edge loading of the orbiting scroll drive bearing. According to the teachings of this invention, the drive surface for a scroll crankshaft is "bowed" or machined to a radius along the length of the drive pin. This radius on the shaft pin allows the pin to deflect under heavy loading and the orbiting scroll hub to move relative to the pin while still maintaining slider block alignment with the orbiting scroll hub bearing. Alternatively, the drive flat on the slider block could be machined to a radius to achieve the same results.

It is an object of this invention to prevent edge loading in the hub bearing of an orbiting scroll.

It is another object of this invention to have a centrally loaded bearing under any operating condition.

It is an additional object of this invention to maintain the bearing and therefore the slider block in alignment even in the event of instability of the orbiting scroll. These objects, and others as will become apparent hereinafter, are accomplished by the present invention.

Basically, a curved surface is provided on one of two contacting members such that linear contact occurs between the two members. Upon flexure or canting of one of the members under load, the line of contact moves relative to the surfaces but remains at essentially the same axial position in spite of the movement so that a centrally loaded bearing can be had for any operating condition.

BRIEF DESCRIPTION OF THE DRAWINGS

For a fuller understanding of the present invention, reference should now be made to the following detailed description thereof taken in conjunction with the accompanying drawings wherein:

FIG. 1 is an end view of a crankshaft for use in a scroll compressor and employing the present invention;

FIG. 2 is a partial vertical sectional view of a scroll compressor employing the present invention taken along a line corresponding to 2—2 of FIG. 3;

FIG. 3 is a sectional view taken along line 3—3 of FIG. 2;

FIG. 4 is a sectional view showing the contact between the drive pin and slider block at no or low load;

FIG. 5 is a sectional view showing the contact between the drive pin and slider block under heavy load with an exaggerated showing of the resultant deflection; and FIG. 6 is a sectional view showing a modified slider block.

DESCRIPTION OF THE PREFERRED EMBODIMENTS

In FIG. 1, the numeral 20 generally designates a crankshaft. Crankshaft 20 has an eccentrically located drive pin 20-1 having curved portion 20-2. The point A represents the axis of the drive pin 20-1 while the point B represents the axis of the crankshaft 20.

In FIG. 2, the numeral 10 generally designates a hermetic scroll compressor having a shell 12. Fixed scroll 14 and orbiting scroll 16 are located within shell 12 and coact to compress gas, as is conventional. Orbiting scroll 16 has an axially extending hub 16-1 having a bore 16-2. As best shown in FIG. 3, slider block 24 is located in bore 16-2 and has a bore 24-1 therein which has a flat portion 24-2. Crankshaft 20 is driven by a motor (not illustrated) and axially extending, eccentrically located drive pin 20-1 is received in bore 24-1 such that flat portion 24-2 is able to move in a direction parallel to drive pin 20-1. Curved portion 20-2 of drive pin 20-1 defines a surface in line contact with flat portion 24-2 of bore 24-1. Curved portion 20-2 has a center of curvature which is transverse to the axis of crankshaft 20 and parallel to the flat portion 24-2.

When compressor 10 is being operated, the motor (not illustrated) causes crankshaft 20 to rotate about its axis, which appears as point B in FIGS. 1 and 3, together with eccentrically located drive pin 20-1. Drive pin 20-1 has an axis A—A which appears as point A in FIGS. 1 and 3. Thus, rotation of crankshaft 20 about its axis causes the axis A—A of drive pin 20-1 to rotate about the point B as shown in FIGS. 1 and 3. The distance between points A and B represents the radius of orbit of orbiting scroll 16. Since drive pin 20-1 is located in and coaxial with bore 24-1, rotation of drive pin 20-1 causes slider block 24 to rotate therewith about the axis of crankshaft 20 as represented by point B. Slider block 24 is located in and is coaxial with bore 16-2 and causes orbiting scroll 16 to orbit, rather than rotate therewith, due to the coaction of Oldham coupling 18 with orbiting scroll 16. Thus, there is relative rotary movement of slider block 24 with respect to orbiting scroll 16. With the compressor 10 operating as described, gases are compressed by the coaction of the fixed and orbiting scrolls which is accompanied by the compressed gas acting on the fixed and orbiting scrolls and tending to cause their radial and axial separation. The radial separation forces are transmitted via hub 16-1 to slider block 24. Referring now to FIG. 4 which represents a no load or very low load condition, it will be noted that drive pin 20-1 is in an unstressed position with curved surface 20-2 being in line contact with flat portion 24-2 at an axial position corresponding to the center of hub 16-1 which acts as a bearing. Referring now to FIG. 5 which represents a heavily loaded condition, it will be noted that drive pin 20-1 has been deflected relative to the FIG. 4 position. However, curved surface 20-2 still is in line contact with flat portion 24-2 at an axial position roughly corresponding to the center of hub 16-1. Thus, the deflection of drive pin 20-1 has little or no impact on the location of the line contact.

FIG. 6 shows a modified slider block 124 in which surface 124-2 is curved rather than flat. Accordingly, drive pin 120-1 of crankshaft 120 has a flat surface 120-2 in line contact with curved surface 124-2. Other than the reversal of surface configurations, the function of the FIG. 6 embodiment will be the same as that of FIGS. 1–5 relative to maintaining the axial position of the point of contact at the center of the bearing.

In the foregoing discussion the coaction of the members has been described as being a line contact. Hertzian compressive stresses will tend to flatten out curved surfaces so that in reality the line contact becomes "band contact" with the width of the band dependent upon the degree of flattening.

Although preferred embodiments of the present invention have been illustrated and described, other changes will occur to those skilled in the art. It is therefore intended that the scope of the present invention is to be limited only by the scope of the appended claims.

CLAIMS

What is claimed is:

1. A self-adjusting crankshaft drive comprising:
   driven means having an axially extending opening therein;
   a crankshaft having an axis;
   axially extending drive means integral with said crankshaft and eccentrically located with respect to said axis;
   said drive means being drivingly located in said opening of said driven means and one of said drive means and driven means having an axially curved surface and the other one of said drive means and driven means having a corresponding flat surface parallel to said axis whereby when said crankshaft rotates about said axis, said drive means rotates eccentrically with respect to said axis and coacts with and drives said driven means such that said axially curved surface engages said corresponding flat surface at an essentially constant axial location relative to said axis even when said drive means is deformed under load.

2. The self-adjusting crankshaft drive of claim 1 wherein said essentially constant axial location is at a midpoint of said axially extending drive means.

3. The self-adjusting crankshaft drive of claim 1 wherein said driven means includes a slider block and an orbiting scroll of a scroll compressor.

4. A scroll type compressor comprising:
   a rotatable crankshaft having an eccentric shaft portion formed thereon;
   a fixed scroll;
   an orbiting scroll cooperable with said fixed scroll to compress gas; and
   bearing means rotatably connecting said orbiting scroll to said eccentric shaft portion so as to orbitally drive said orbiting scroll, wherein said bearing means comprises:
   a) a bushing having an outer periphery fitted in said orbiting scroll, and
   b) a non-rotatable connection between said bushing and said eccentric shaft portion, said non-rotatable connection including a portion curved in the direction of the axis of rotation of the crankshaft.

5. A scroll type compressor comprising:
   first scroll means;
   second scroll means cooperable with said first scroll means to compress gas;
   driven means drivingly coacting with said second scroll means;
   a crankshaft having an axis;
   axially extending drive means integral with said crankshaft and eccentrically located with respect to said axis;
   said drive means being drivingly located with respect to said driven means and one of said drive means and driven means having an axially curved surface and the other one of said drive means and driven means having a corresponding flat surface parallel to said axis whereby when said crankshaft rotates about said axis, said drive means rotates eccentrically with respect to said axis and coacts with and drives said driven means such that said axially curved surface engages said corresponding flat surface at an essentially constant axial location relative to said axis even when said drive means is deformed under load.

* * * * *